(12) United States Patent
Danilov et al.

(10) Patent No.: US 10,754,845 B2
(45) Date of Patent: Aug. 25, 2020

(54) SYSTEM AND METHOD FOR XOR CHAIN

(71) Applicant: EMC IP Holding Company LLC, Hopkinton, MA (US)

(72) Inventors: Mikhail Danilov, Saint Petersburg (RU); Konstantin Buinov, Kirovsk (RU); Andrey Fomin, Vsevolozhsk (RU); Mikhail Malygin, Saint Petersburg (RU); Ivan Tchoub, Saint Petersburg (RU)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 253 days.

(21) Appl. No.: 15/636,435

(22) Filed: Jun. 28, 2017

(65) Prior Publication Data

US 2018/0181612 A1 Jun. 28, 2018

(30) Foreign Application Priority Data

Dec. 23, 2016 (RU) ................................ 2016150865

(51) Int. Cl.
*G06F 17/00* (2019.01)
*G06F 16/23* (2019.01)
*G06F 16/27* (2019.01)

(52) U.S. Cl.
CPC .......... *G06F 16/2365* (2019.01); *G06F 16/27* (2019.01)

(58) Field of Classification Search
CPC .............. G06F 16/9535; G06F 3/0482; G06F 16/24578; G06F 9/45558; G06F 16/24522
See application file for complete search history.

(56) References Cited

U.S. PATENT DOCUMENTS

| | | | | |
|---|---|---|---|---|
| 2009/0049539 A1* | 2/2009 | Halbedel | ............. | H04L 63/0272 726/14 |
| 2011/0302446 A1* | 12/2011 | Becker-Szendy | ............................ | G06F 11/1076 714/6.1 |
| 2017/0012814 A1* | 1/2017 | Zaidi | .................... | H04L 41/5009 |

* cited by examiner

*Primary Examiner* — Truong V Vo
(74) *Attorney, Agent, or Firm* — Womble Bond Dickinson (US) LLP (57) ABSTRACT

One embodiment is related to a method for creating a redundancy data chunk for data protection with a chain topology, comprising: transmitting a data chunk of a first frontend zone of a data storage system to a second frontend zone of the data storage system; creating a redundancy data chunk at the second frontend zone of the data storage system based on the data chunk of the first frontend zone and a data chunk of the second frontend zone; passing the redundancy data chunk onto one or more subsequent frontend zones of the data storage system from the second frontend zone, wherein at each subsequent frontend zone the redundancy data chunk is updated based on the received redundancy data chunk and a data chunk of the respective subsequent frontend zone, and wherein the redundancy data chunk is passed through each subsequent frontend zone exactly once; and at a last subsequent frontend zone of the data storage system, forwarding the updated redundancy data chunk to a backend zone of the data storage system for final storage.

18 Claims, 6 Drawing Sheets

SYSTEM AND METHOD FOR XOR CHAIN

CROSS-REFERENCE TO RELATED APPLICATIONS

This application claims priority to Russian Patent Application No. 2016150865, filed Dec. 23, 2016, which is incorporated herein by reference in its entirety.

Field of the Invention

Embodiments of the disclosure are related to data storage, and more particularly, to a method, apparatus, and system for data protection in a geo-replication cloud setup.

Background

Cloud-based data storage solutions are becoming increasingly popular. One example is the Elastic Cloud Storage (ECS) service provided by Dell EMC. Latest trends in software architecture and development are used in these solutions to achieve outstanding scalability, availability, and serviceability.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments of the disclosure relate to an implementation of the XOR (exclusive or) technique for data protection in a geographically distributed environment.

Cloud-based data storage solutions are becoming increasingly popular. In a cloud-based data storage system, data may be protected with data redundancy provided with geo-replication, which may also be referred to as remote replication hereinafter. In short, geo-replication provides enhanced protection against site failures by having multiple copies of the data, i.e., a primary copy of the data at the original site and one or more secondary copies of the data at one or more remote sites. In one embodiment, the remote replication may work at the data chunk level. The sites may be geographically distributed, e.g., on different continents, and may also be referred to as zones hereinafter. In one embodiment, a cloud storage system may support up to 8 zones. Further, the XOR (exclusive or) technique may be used with geo-replication to reduce capacity overhead.

In one embodiment, all disk space is partitioned into a set of blocks of a fixed size called chunks. The chunks size may be 128 Megabytes (MBs). All user data may be stored in these chunks and the chunks may be shared by different user data objects. One chunk may contain segments of several user objects. Chunk content may be modified in append-only mode. When a chunk becomes full enough, it may be sealed. Content of sealed chunks may be immutable.

Figure 1:
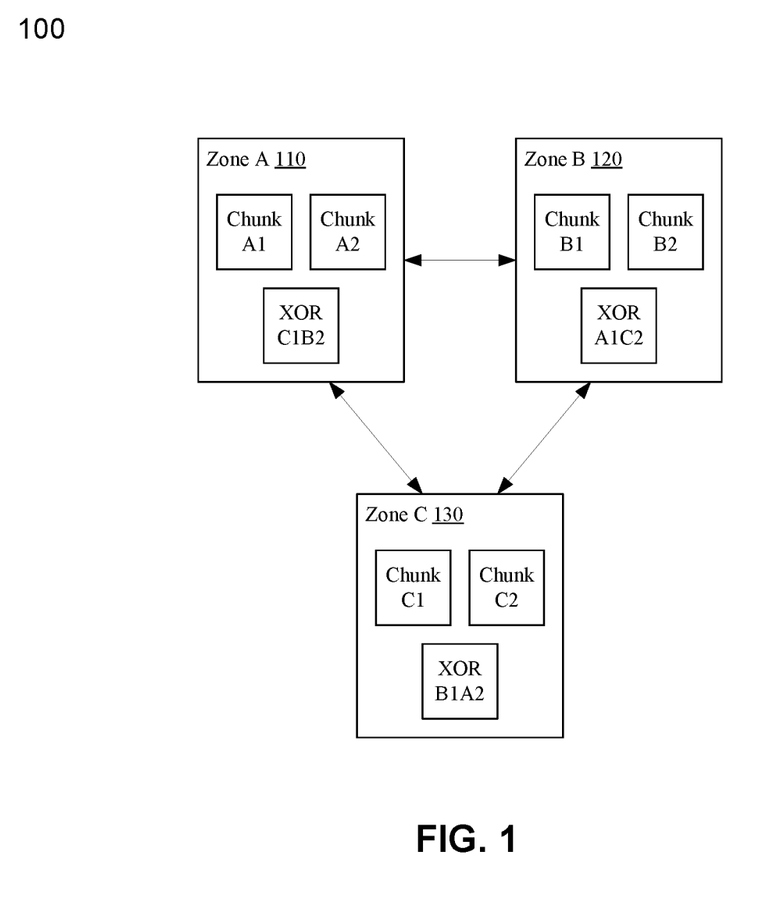
FIG. 1 is a block diagram illustrating an example cloud storage system.

Referring to FIG. 1, a block diagram illustrating an example cloud storage system 100 is shown. The example system 100 illustrated in FIG. 1 comprises three zones: Zone A 110, Zone B 120, and Zone C 130. All the zones may communicate with each other. Each zone has two data chunks of its own: Zone A 110 has Chunk A1, Chunk A2; Zone B 120 has Chunk B1, Chunk B2; and Zone C 130 has Chunk C1, Chunk C2.

The example system 100 also utilizes geo-replication with the XOR technique. Each zone may have an XOR chunk that is created by performing a bitwise XOR operation on two data chunks from the other two zones respectively. For example, Zone A 110 receives a copy of Chunk C1 from Zone C 130 and a copy of Chunk B2 from Zone B 120, and creates an XOR chunk: XOR C1B2=XOR (Chunk C1, Chunk B2). Similarly, Zone B 120 creates and stores an XOR A1C2 chunk, and Zone C 130 creates and stores an XOR B1A2 chunk.

With remote replication and the XOR technique, the example system 100 may recover from a failure of a single zone. In other words, disaster recovery may be performed. For example, in Zone C 130 fails suddenly and permanently, data chunks hosted at Zone C 130 (i.e., Chunk C1 and Chunk C2) may be restored (recreated) based on data stored at Zone A 110 and at Zone B 120. In particular, after the permanent failure of Zone C 130, Zone A 110 may receive a copy of Chunk B2 from Zone B 120 and restores Chunk C1 locally with the copy of Chunk B2 and the stored XOR chunk XOR C1B2: Chunk C1=XOR (XOR C1B2, Chunk B2). Similarly, Zone B 120 may restore Chunk C2 locally: Chunk C2=XOR (XOR A1C2, Chunk A1). Therefore, Chunk C1 and Chunk C2 become available again, but are served from Zone A 110 and Zone B 120, respectively, instead of from Zone C 130.

Although FIG. 1 illustrates an example system 100 with three zones, the scheme (geo-replication with XOR) may be adapted for systems with more than three zones. If the number of zones is N, the XOR technique may reduce capacity overhead by N−1 times.

Figure 2:
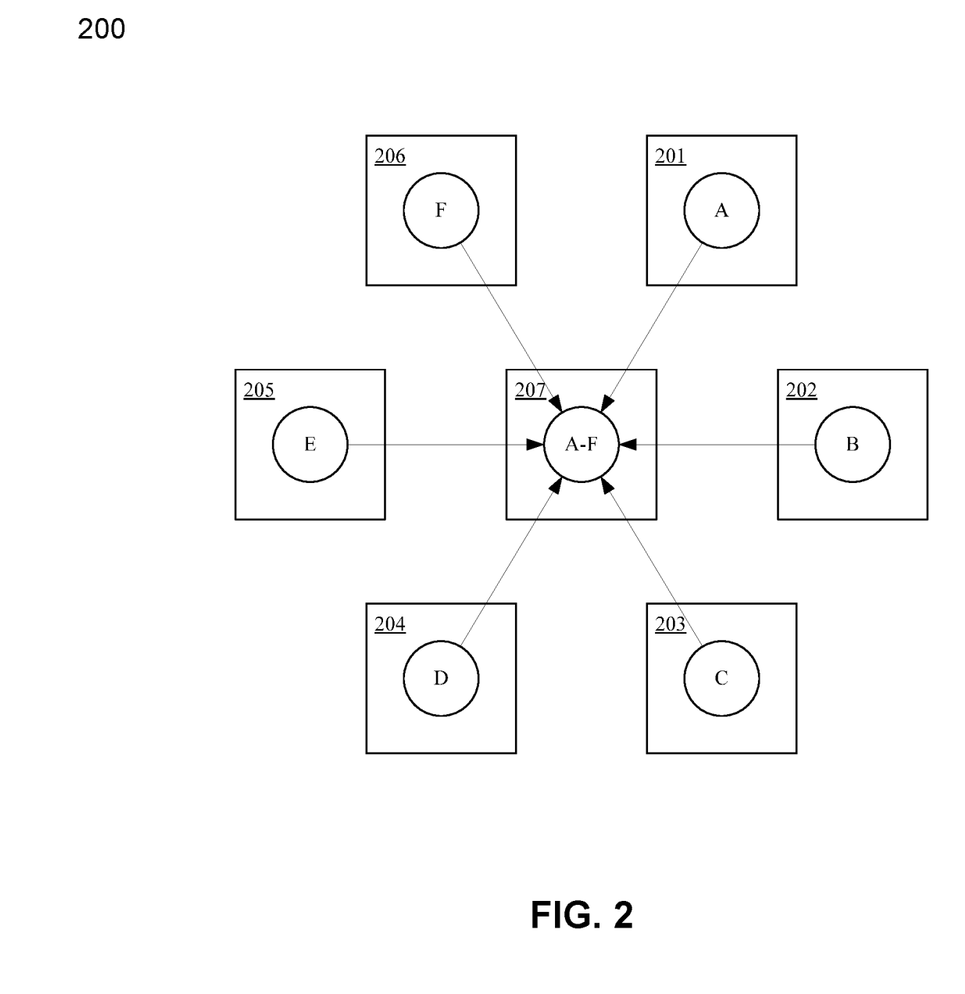
FIG. 2 is a block diagram illustrating an example cloud storage system with a conventional XOR implementation.

Referring to FIG. 2, a block diagram illustrating an example cloud storage system 200 with a conventional XOR implementation is shown. There are 6 frontend zones that actively host user data and receive writes from data clients. They are zones 201 through 207. There is also a backend zone 207, which is solely used to store XOR chunks for all the data chunks produced by the zones 201 through 206. With the XOR chunks, recovery is possible after a failure of any single zone/cluster. If workload is balanced well enough between the zones 201 through 206, then all the zones, including zone 207, use more or less equal amount of storage capacity. However, as should be appreciated by a person skill in the art, incoming network traffic for zone 207 is rather excessive. There is the same problem at zone 207 when chunk recovery is performed.

Thus, embodiments of the disclosure relate to a data protection method on a geographically distributed cloud storage system that has the same capacity efficiency as the geo-replication with XOR scheme described above, but does not overwhelm any single zone with excessive network traffic. In other words, preferably the network traffic load should be evenly distributed between zones/clusters.

The topology illustrated in FIG. 2 above may be referred to as incoming star. Embodiments of the disclosure may relate to a chain topology. The creation of XOR chunks with the chain topology works as follows. A first zone may create a backup copy of its chunk in the second zone by means of replication (i.e., the first zone may transmit a copy of its data chunk to the second zone and the second zone stores the received data chunk). The second zone may use its own chunk and the backup copy of the chunk from the first zone to create a combined XOR chunk. The second zone may then move the created XOR chunk to the third zone. Afterwards the second zone may remove the backup copy of the chunk received from the first zone. Similarly, the third zone may update the XOR chunk based on its own data chunk, and then forward the updated XOR chunk to a fourth zone, where the process repeats, and so on, until the XOR chunk reaches the last zone in the chain. In one embodiment, the last zone in the chain may be a backend zone that does not host user data. If a distributed cloud storage system consists of N zones/clusters (N may be greater than 3), then up to N−1 chunks from different zones/clusters may be combined in one XOR chunk.

Thus, a XOR chunk is created by the zones that contain source chunks for it. The final XOR chunk may be stored in a backend zone at the end of the chain that does not host user data. Chunk recovery with an XOR chain works in a similar fashion. The backend zone with the XOR chunk provides the content of the XOR chunk only. The zones that actively host user data may perform all the processing to restore content of the missing chunk.

Figure 3:
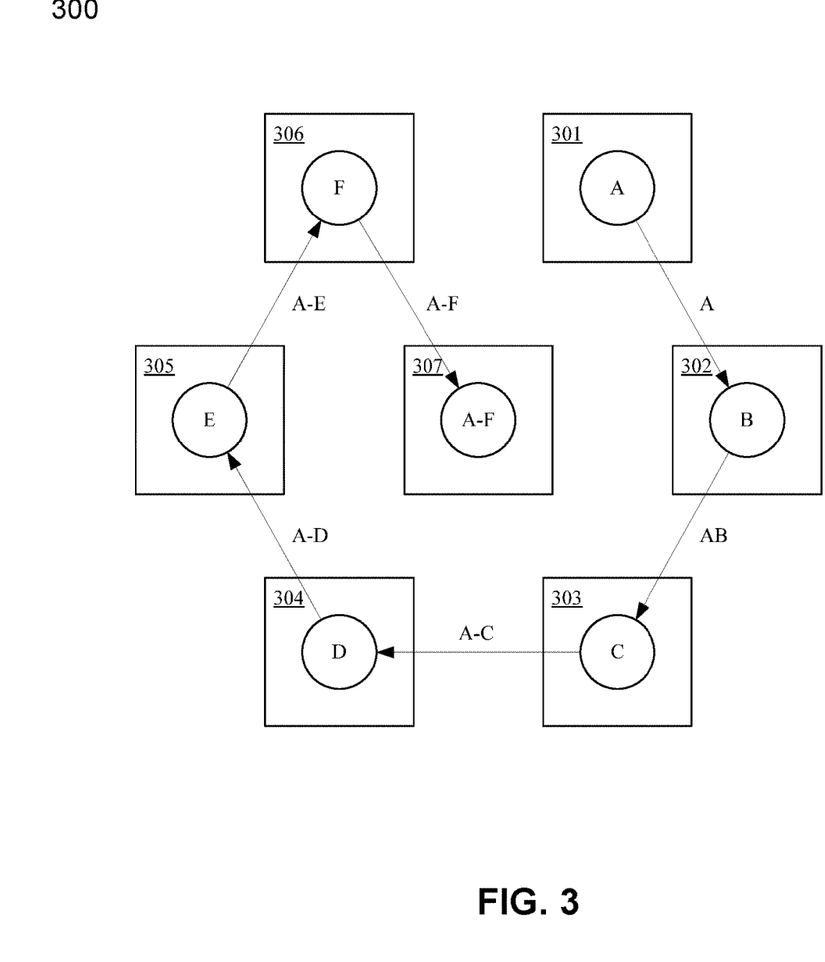
FIG. 3 is a block diagram illustrating an example cloud storage system with a chain XOR implementation.

Referring to FIG. 3, a block diagram illustrating an example cloud storage system 300 with a chain XOR implementation is shown. In the example illustrated, the process may start with zone 301. However, it should be appreciated that frontend zones are not inherently ordered, and the process may start with any frontend zone and may proceed to other frontend zones in any order, as long as the process passes through each frontend zone once and ends with the backend zone. Zone 301 may create a backup copy of its chunk A in zone 302. Zone 302 may create an intermediate XOR chunk for the backup copy of chunk A and its chunk B. Afterwards zone 302 may move the created XOR chunk to zone 303 and remove the backup copy of chunk A. The process repeats at zone 303 (which may update the XOR chunk by performing a bitwise XOR operation on the received intermediate XOR chunk and its own data chunk and forward the updated intermediate XOR chunk to zone 304), and so on (for zones 305 and 306), until it reaches zone 306. Zone 306 may receive the intermediate XOR chunk created and updated based on chunks A through E (i.e., data chunks of zones 301 through 305). Zone 306 produces the final XOR chunk based on the received intermediate XOR chunk received and its chunk F. Afterwards zone 306 may move the final XOR chunk it created to the backend zone 307 and remove the intermediate XOR chunk received. Therefore, the final XOR chunk in the present example may be represented with the following formula: final XOR chunk=chunk A XOR chunk B XOR chunk C XOR chunk D XOR chunk E XOR chunk F.

A person skilled in the art should realize that the chain XOR scheme does not change overall resource consumption of the data protection process when compared to the incoming star implementation. There are still the same number of chunks to be XORed and the same amount of chunk data transmission between zones. The benefit of the chain implementation is even workload distribution between the zones. Notably, the backend zone 307 in the example above is not overwhelmed with incoming network traffic.

Figure 4:
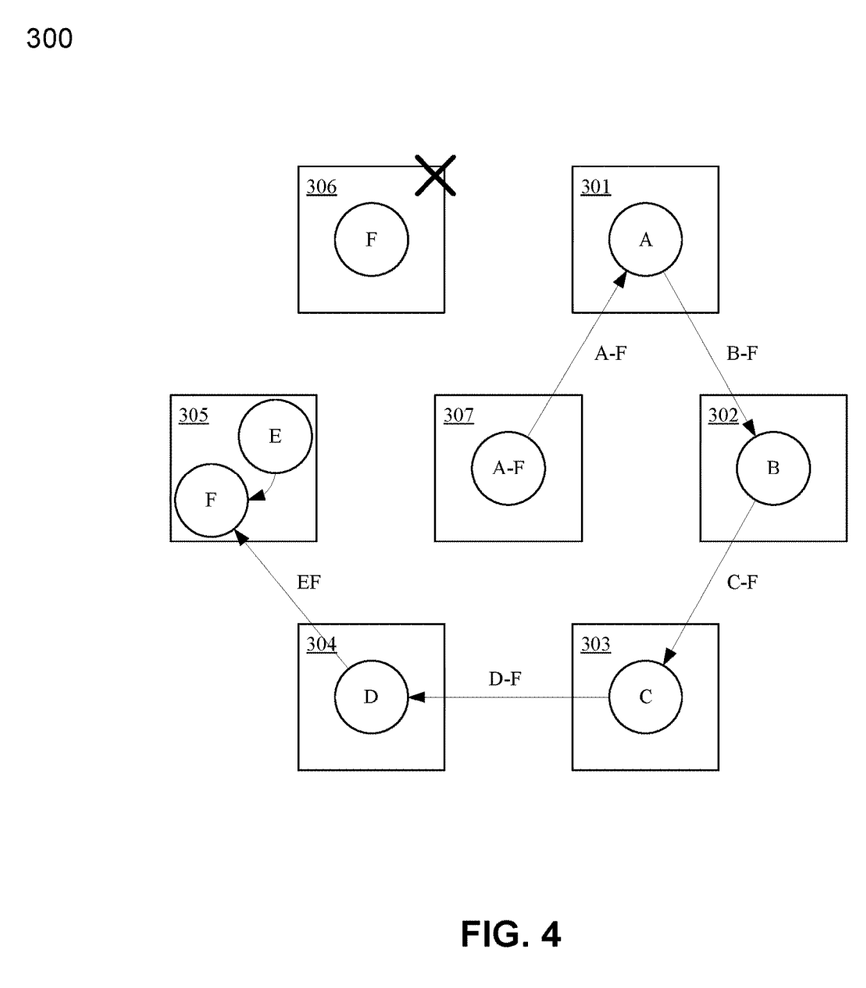
FIG. 4 is a diagram illustrating data chunk recovery in the example storage system.

Referring to FIG. 4, a diagram 400 illustrating data chunk recovery in the example storage system 300 is shown. After failure of zone 306, the chunk F it used to store becomes unavailable. Zone 301 starts the recover process. It may read the final XOR chunk from zone 307 and "withdraw" content of its chunk A from the final XOR chunk by performing a bitwise XOR operation on the final XOR chunk from zone 307 and its own chunk A. The resulting intermediate XOR chunk with chunk A "withdrawn" may passed onto other healthy frontend zones. In this illustrated example, the intermediate XOR chunk is passed onto zones 302 through 305, in that order, where at each frontend zone 302 through 305, the zone "withdraws" the content of its own data chunk by performing an XOR operation. At the end, zone 305 may receive the XOR chunk with the content of chunks A through D withdrawn, which a person skill in the art should realize is equal to chunk E XOR chunk F. Zone 5 may this XOR chunk and its own chunk E to restore the exact content of chunk F by performing an XOR operation. Another benefit of the chain XOR implementation relates to the disaster recovery use case explained herein. As FIG. 4 shows, with the use of the XOR chain the recovered chunk F appears at zone 305, which is a frontend zone. If the conventional incoming star implementation illustrated in FIG. 2 is used, then chunk F would appear at the backend zone 307, so the recovered chunk must be transmitted to one of the frontend zones, resulting in additional network traffic load.

Figure 5:
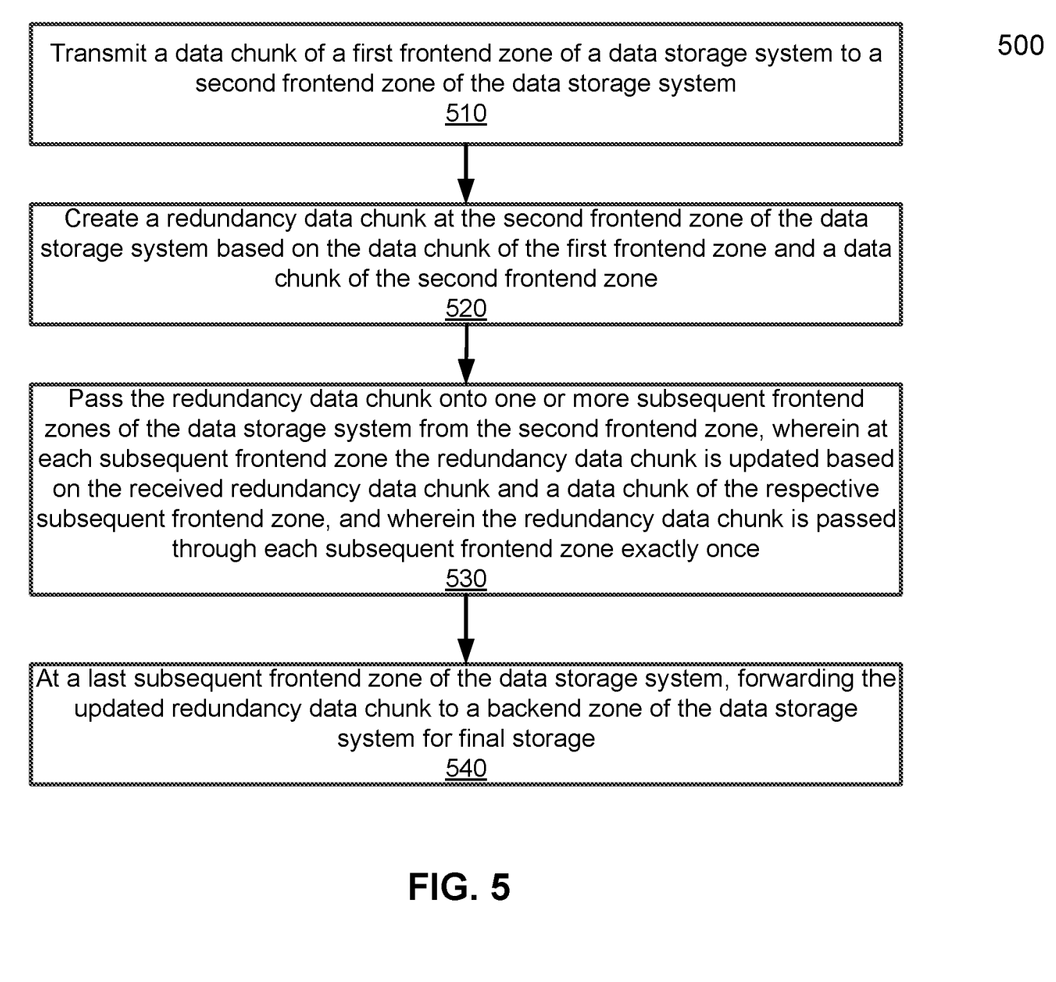
FIG. 5 is a flowchart illustrating an example method for creating a redundancy data chunk for data protection with a chain topology.

Referring to FIG. 5, a flowchart illustrating an example method 500 for creating a redundancy data chunk for data protection with a chain topology is shown. At block 510, a data chunk of a first frontend zone of a data storage system may be transmitted to a second frontend zone of the data storage system. At block 520, a redundancy data chunk may be created at the second frontend zone of the data storage system based on the data chunk of the first frontend zone and a data chunk of the second frontend zone. The redundancy data chunk may be an XOR chunk. At block 530, the redundancy data chunk may be passed onto one or more subsequent frontend zones of the data storage system from the second frontend zone, wherein at each subsequent frontend zone the redundancy data chunk may be updated based on the received redundancy data chunk and a data chunk of the respective subsequent frontend zone, and wherein the redundancy data chunk may be passed through each subsequent frontend zone exactly once. An XOR chunk may be updated at a particular frontend zone by performing a bitwise XOR operation on the received XOR chunk and a data chunk of the particular frontend zone. At block 540, at a last subsequent frontend zone of the data storage system, the updated redundancy data chunk may be forwarded to a backend zone of the data storage system for final storage. The frontend and backend zones of the data storage system may be geographically distributed. After the redundancy data chunk is stored in the backend zone, a data chunk of a single failed frontend zone may be recovered based on the redundancy data chunk and data chunks of healthy frontend zones. During data recovery, the redundancy data chunk may be passed through each healthy frontend zone exactly once, wherein at each healthy frontend zone, the respective frontend zone withdraws its data chunk from the redundancy data chunk.

Method 500 may be performed by processing logic that includes hardware (e.g. circuitry, dedicated logic, etc.), software (e.g., embodied on a non-transitory computer readable medium), or a combination thereof. For example, method 500 may be performed by processors 1501 of FIG. 6. Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Therefore, according to the embodiments of the disclosure herein, an XOR redundancy data chunk scheme may be implemented in a chain topology. By generating and updating the XOR chunk at each and every frontend zone, during both XOR chunk generation and data recovery, the processing and network traffic load may be evenly distributed between all the zones, frontend and backend. Excessive network traffic load on the backend zone that stores the final XOR chunk associated with the conventional incoming star implementation may be avoided.

Figure 6:
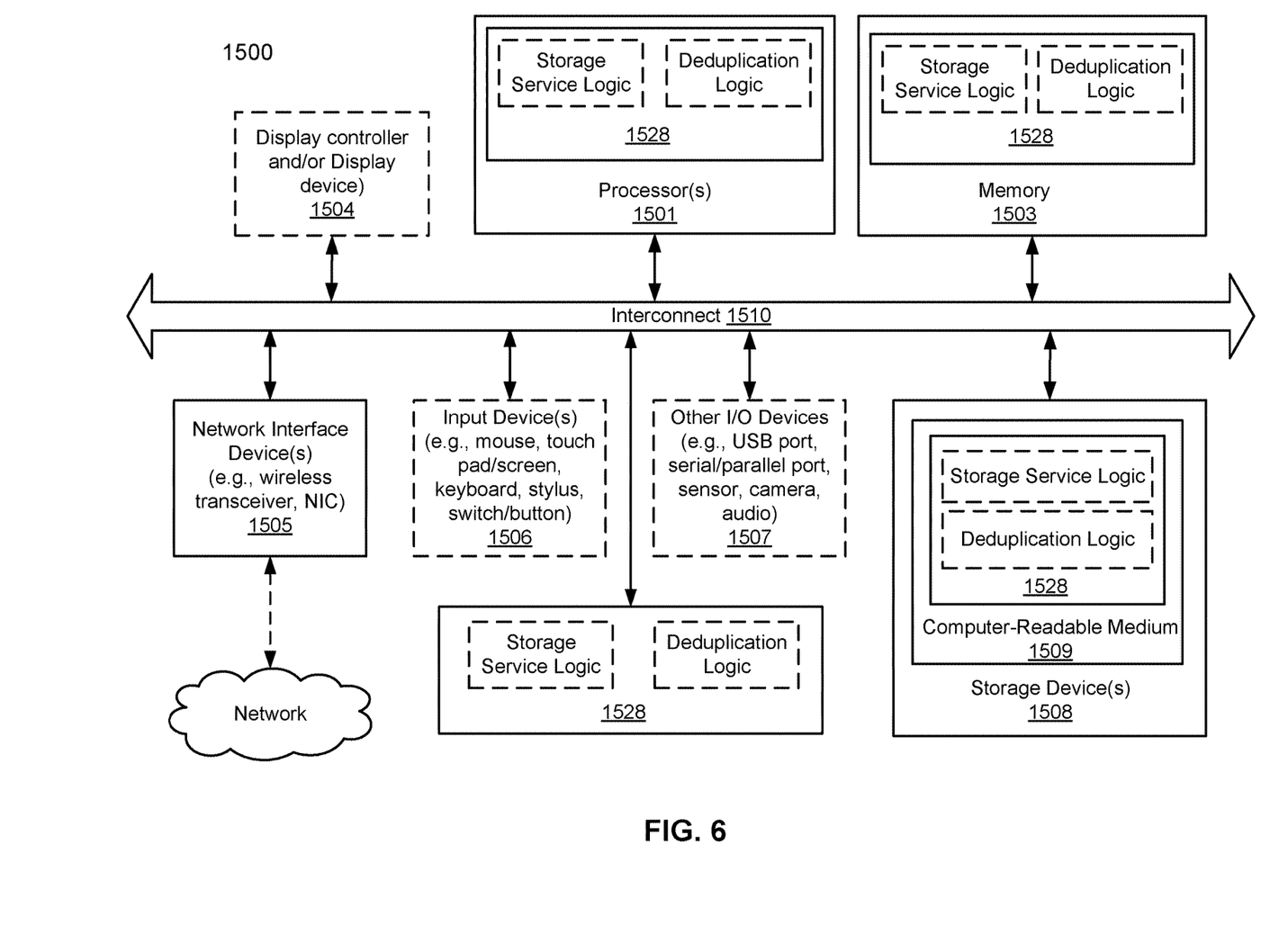
FIG. 6 is a block diagram illustrating an example of a data processing system which may be used with one embodiment of the disclosure.

FIG. 6 is a block diagram illustrating an example of a data processing system 1500 which may be used with one embodiment of the disclosure. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for creating a redundancy data chunk for data protection with a chain topology, comprising:
    transmitting a data chunk of a first frontend zone of a data storage system to a second frontend zone of the data storage system;
    creating a redundancy data chunk at the second frontend zone of the data storage system based on the data chunk of the first frontend zone and a data chunk of the second frontend zone;
    passing the redundancy data chunk onto one or more subsequent frontend zones of the data storage system from the second frontend zone, wherein at each subsequent frontend zone the redundancy data chunk is updated based on the received redundancy data chunk and a data chunk of the respective subsequent frontend zone, and wherein the redundancy data chunk is passed through each subsequent frontend zone exactly once; and
    at a last subsequent frontend zone of the data storage system, forwarding the updated redundancy data chunk to a backend zone of the data storage system for final storage, wherein the backend zone is dedicated to storage of the redundancy data chunk generated based on an exclusive or (XOR) technique and does not host user data, and wherein the frontend and backend zones of the data storage system are geographically distributed.

2. The method of claim 1, wherein the redundancy data chunk is an exclusive or (XOR) chunk.

3. The method of claim 2, wherein the XOR chunk is updated at a particular frontend zone by performing a bitwise XOR operation on the received XOR chunk and a data chunk of the particular frontend zone.

4. The method of claim 1, further comprising after the redundancy data chunk is stored in the backend zone, recovering a data chunk of a single failed frontend zone based on the redundancy data chunk and data chunks of healthy frontend zones.

5. The method of claim 4, wherein during data recovery, the redundancy data chunk is passed through each healthy frontend zone exactly once.

6. The method of claim 5, wherein at each healthy frontend zone, the respective frontend zone withdraws its data chunk from the redundancy data chunk.

7. A non-transitory machine-readable medium having instructions stored therein which, when executed by a processor, cause the processor to perform testing operations, the operations comprising:
    transmitting a data chunk of a first frontend zone of a data storage system to a second frontend zone of the data storage system;
    creating a redundancy data chunk at the second frontend zone of the data storage system based on the data chunk of the first frontend zone and a data chunk of the second frontend zone;
    passing the redundancy data chunk onto one or more subsequent frontend zones of the data storage system from the second frontend zone, wherein at each subsequent frontend zone the redundancy data chunk is updated based on the received redundancy data chunk and a data chunk of the respective subsequent frontend zone, and wherein the redundancy data chunk is passed through each subsequent frontend zone exactly once; and
    at a last subsequent frontend zone of the data storage system, forwarding the updated redundancy data chunk to a backend zone of the data storage system for final storage, wherein the backend zone is dedicated to storage of the redundancy data chunk generated based on an exclusive or (XOR) technique and does not host user data, and wherein the frontend and backend zones of the data storage system are geographically distributed.

8. The non-transitory machine-readable medium of claim 7, wherein the redundancy data chunk is an exclusive or (XOR) chunk.

9. The non-transitory machine-readable medium of claim 8, wherein the XOR chunk is updated at a particular frontend zone by performing a bitwise XOR operation on the received XOR chunk and a data chunk of the particular frontend zone.

10. The non-transitory machine-readable medium of claim 7, wherein the operations further comprise after the redundancy data chunk is stored in the backend zone, recovering a data chunk of a single failed frontend zone based on the redundancy data chunk and data chunks of healthy frontend zones.

11. The non-transitory machine-readable medium of claim 10, wherein during data recovery, the redundancy data chunk is passed through each healthy frontend zone exactly once.

12. The non-transitory machine-readable medium of claim 11, wherein at each healthy frontend zone, the respective frontend zone withdraws its data chunk from the redundancy data chunk.

13. A data processing system, comprising:
    a processor; and
    a memory coupled to the processor storing instructions which, when executed by the processor, cause the processor to perform testing operations, the operations including
    transmitting a data chunk of a first frontend zone of a data storage system to a second frontend zone of the data storage system;
    creating a redundancy data chunk at the second frontend zone of the data storage system based on the data chunk of the first frontend zone and a data chunk of the second frontend zone;
    passing the redundancy data chunk onto one or more subsequent frontend zones of the data storage system from the second frontend zone, wherein at each subsequent frontend zone the redundancy data chunk is updated based on the received redundancy data chunk and a data chunk of the respective subsequent frontend zone, and wherein the redundancy data chunk is passed through each subsequent frontend zone exactly once; and at a last subsequent frontend zone of the data storage system, forwarding the updated redundancy data chunk to a backend zone of the data storage system for final storage, wherein the backend zone is dedicated to storage of the redundancy data chunk generated based on an exclusive or (XOR) technique and does not host user data, and wherein the frontend and backend zones of the data storage system are geographically distributed.

14. The data processing system of claim 13, wherein the redundancy data chunk is an exclusive or (XOR) chunk.

15. The data processing system of claim 14, wherein the XOR chunk is updated at a particular frontend zone by performing a bitwise XOR operation on the received XOR chunk and a data chunk of the particular frontend zone.

16. The data processing system of claim 13, wherein the operations further comprise after the redundancy data chunk is stored in the backend zone, recovering a data chunk of a single failed frontend zone based on the redundancy data chunk and data chunks of healthy frontend zones.

17. The data processing system of claim 16, wherein during data recovery, the redundancy data chunk is passed through each healthy frontend zone exactly once.

18. The data processing system of claim 17, wherein at each healthy frontend zone, the respective frontend zone withdraws its data chunk from the redundancy data chunk.

\* \* \* \* \*